United States Patent [19]

Elmer

[11] Patent Number: 4,880,248
[45] Date of Patent: Nov. 14, 1989

[54] MANUALLY PROPELLED AUTOMOTIVE PAINTING TOOL CART

[76] Inventor: Mark Elmer, 1067 W. Parkwood, Flint, Mich. 48507

[21] Appl. No.: 189,659

[22] Filed: May 3, 1988

[51] Int. Cl.⁴ ............................................... B62B 3/02
[52] U.S. Cl. ................................... 280/47.35; 108/64; 280/79.2
[58] Field of Search ..................... 280/47.18, 30, 47.35, 280/79.1 R, 79.1 A, 79.2; 296/158; 108/64, 59; 248/129, 638; 105/1.4

[56] References Cited

U.S. PATENT DOCUMENTS

| | | | |
|---|---|---|---|
| 1,660,521 | 2/1928 | Nordgren | 280/47.35 |
| 1,708,906 | 4/1929 | Sparks et al. | 280/47.35 |
| 2,453,631 | 11/1948 | Leser et al. | 280/47.18 |
| 2,883,731 | 4/1959 | Wells | 280/47.19 |
| 3,162,462 | 12/1964 | Elders | 280/79.2 |
| 3,573,879 | 4/1971 | Bergkamp | 280/47.35 |
| 3,853,329 | 12/1974 | McDonald | 280/47.35 |
| 4,281,843 | 8/1981 | Johnson et al. | 280/47.26 |
| 4,350,366 | 9/1982 | Helms | 280/47.33 |
| 4,522,420 | 6/1985 | Hannappel | 280/769 |
| 4,758,007 | 7/1988 | Reck | 280/33.99 A |

FOREIGN PATENT DOCUMENTS

| | | | |
|---|---|---|---|
| 2367456 | 6/1978 | France | 280/79.2 |
| 689749 | 4/1953 | United Kingdom | 108/64 |
| 2044186 | 10/1980 | United Kingdom | 280/79.1 R |
| 2177354 | 1/1987 | United Kingdom | 280/47.35 |
| 2189198 | 10/1987 | United Kingdom | 280/47.35 |

Primary Examiner—Charles A. Marmor
Assistant Examiner—Eric Culbreth
Attorney, Agent, or Firm—Krass & Young

[57] ABSTRACT

A manually propelled automotive painting cart including a main unit, at least one auxiliary units, and a connection device. The main unit possesses a top tray unit and at least one lower tray unit attached to a portable support frame, the top tray being partitioned for tool and material storage. A shelf unit is located below the top tray providing horizontal and vertical storage space for flat materials such as paint chip books and sandpaper. Other storage elements, including a wastepaper basket and water tank, are attached to the main unit. The auxiliary unit possesses at least one tray unit attached to a portable support frame. Dispensers for rolled paper and tape, along with other storage elements, are attached to the auxiliary unit. A removable connection device detachably attaches the main unit and the auxiliary unit providing storage and transportation for all of the tools and materials required for automotive painting. Equipment for a particular portion of an automotive painting project, such as the taping and masking of the item, can be stored on an auxiliary unit which can be detached and used by itself as a portable tool cart for that specific function. The automotive painting tool cart can thus be utilized as a complete tool cart or as discrete tool carts for specific applications.

3 Claims, 2 Drawing Sheets

MANUALLY PROPELLED AUTOMOTIVE PAINTING TOOL CART

TECHNICAL FIELD OF THE INVENTION

The present invention generally relates to tool carts, and more particularly, to tool carts that are manually propelled for use in hauling, storing and organizing equipment used in the automobile body painting industry.

BACKGROUND OF THE INVENTION

For many years, people have sought to organize the tools of their trade. More recently, people have sought to place the tools in a portable, organized framework. Unfortunately, few frameworks can maintain the tools of a trade in a fixed, organized pattern, and even fewer can maintain them in a portable, organized pattern. Too frequently, tools are placed in a myriad of places other than the specific place allotted to it in the organizational system. Tools are placed in the corner, left where they were last used, thrown randomly into a pile of other organized tools, and otherwise lost into an unorganized oblivion. There are many reasons of this general state of affairs.

First, and possibly most basic, given the large number of different sizes, shapes and functions of tools on the market, and the potential combinations used in any one trade, a cart designed for tool storage of one trade will not be as useful in another trade unless they use identical tools. A cart used in the lawn and garden operations will not be of much utility to a person in an automotive repair or automotive painting operation.

Secondly, many tool carts that are designed to be portable are not truly such. Due to the manner of placing a variety of different sizes and shapes of tools in or about the cart, it becomes too large, clumsy or awkward. This deprives a tool cart of its portable nature.

Third, a tool cart that is truly portable may create the need for duplicate tools in a given operational setting. If multiple similar tasks are being performed in different areas of an operation, and the tool cart is taken to one corner of the operation, someone in the opposite corner must either have his own set of tools, or walk across the operation. This is a shortcoming in any multiple user situation.

Fourth by the nature of the automotive painting industry, not only must the tools of that industry be organized, but also the materials, clean-up and waste must be organized as well. For proper painting procedures to occur, materials, equipment, and the surface of the object to be painted must be free of contaminants. In addition areas not to be painted must be effectively hidden under paper masks from the painting procedure. This creates an inordinate amount of waste paper and waste paint products, all of which must be effectively handled.

Heretofore, tool carts have been of a nature that will adequately transport and store tools, but have not been of a design allowing for the detachment of multiple subassembly or unit.

The following United States patents are the closest prior art of which the inventor is aware.

Helms: U.S. Pat. No. 4,350,366 possesses wheels 2, bottom storage box 1, and compartments 18, 20.

Wells: U.S. Pat. No. 2,883,731 possesses wheels 28.

Johnson et al.: U.S. Pat. No. 4,281,843 possesses wheels 60, tool receptacles 14, 18, hook 134, and frame 12.

None of the references to the prior art discloses a tool cart performing all of the functions as previously described and hereafter claimed.

SUMMARY OF THE INVENTION

It is a object of this invention to provide a tool cart for use in the automotive painting industry which will hold the tools and supplies of that industry, including but not limited to, paint cans, bottles, spray cans, brushes, tape, paper, and spray guns.

It is also an object of this invention to provide a tool cart that is portable yet free standing, both while in use and in storage.

It is also an object of this invention to provide a tool cart which may be used as one portable unit, or be divisible into portable subunits, each of which is portable and free standing.

BRIEF DESCRIPTION OF THE DRAWINGS

With these and other objects in view, the invention consists of certain novel features as will be hereinafter fully described, and, in which, the separate parts ar designated by suitable reference characters in each of the views, and in which.

DESCRIPTION OF THE PREFERRED EMBODIMENT

Figure 1:
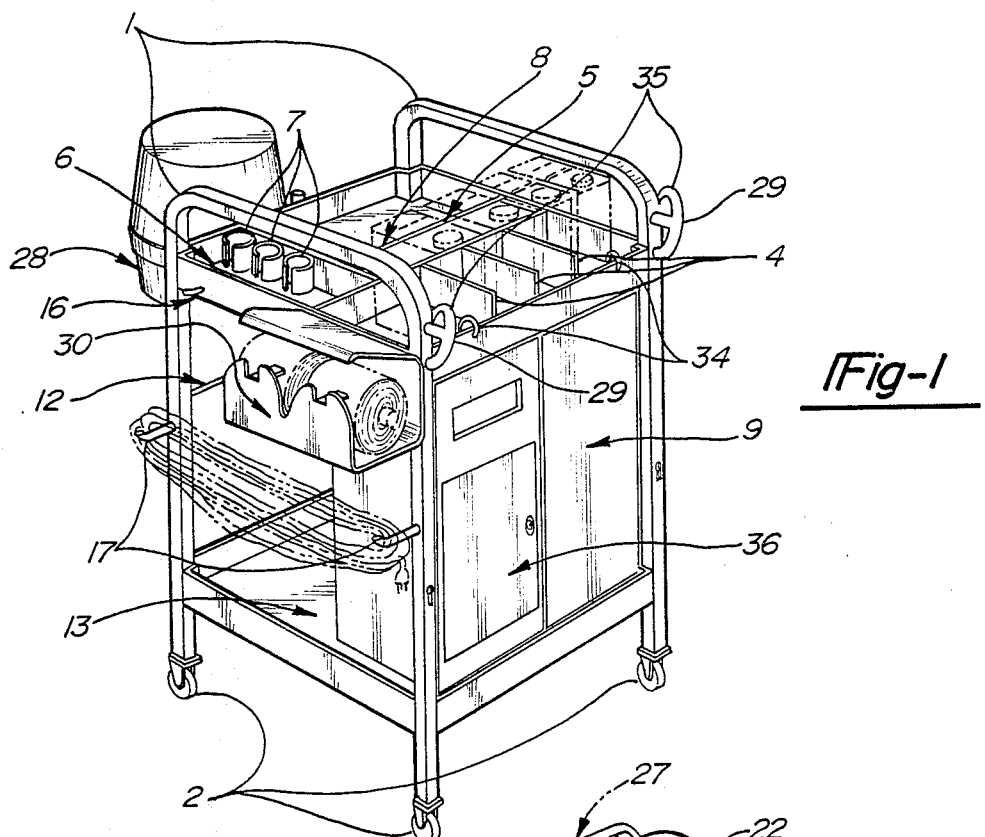
FIG. 1 is a perspective view of the main unit of the tool cart.
Figure 2:
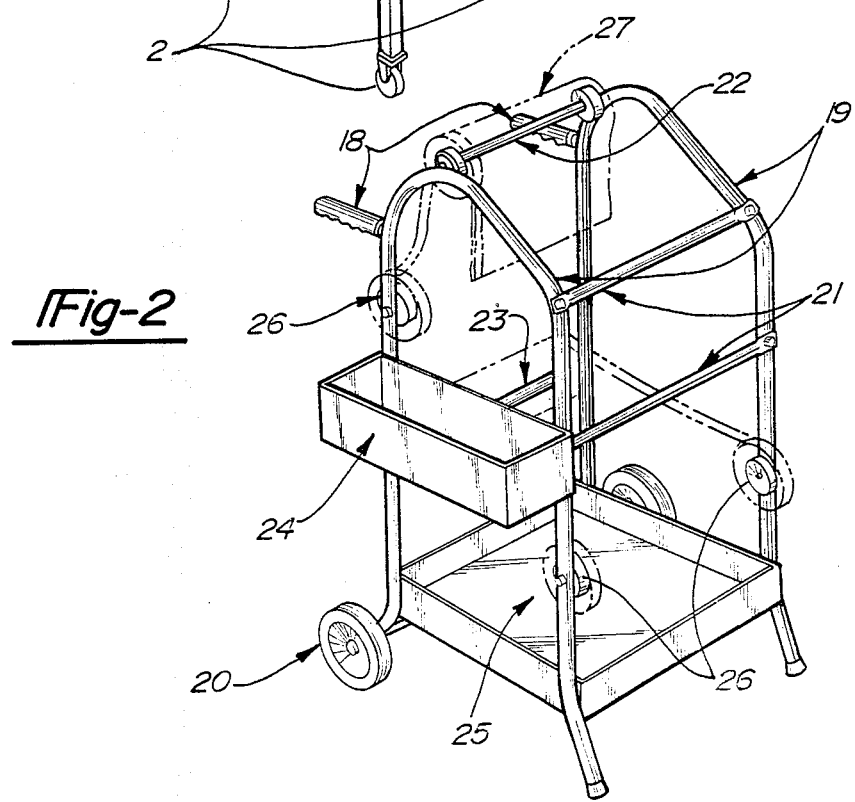
FIG. 2 is a perspective view of an auxiliary unit of the tool cart.
Figure 3:
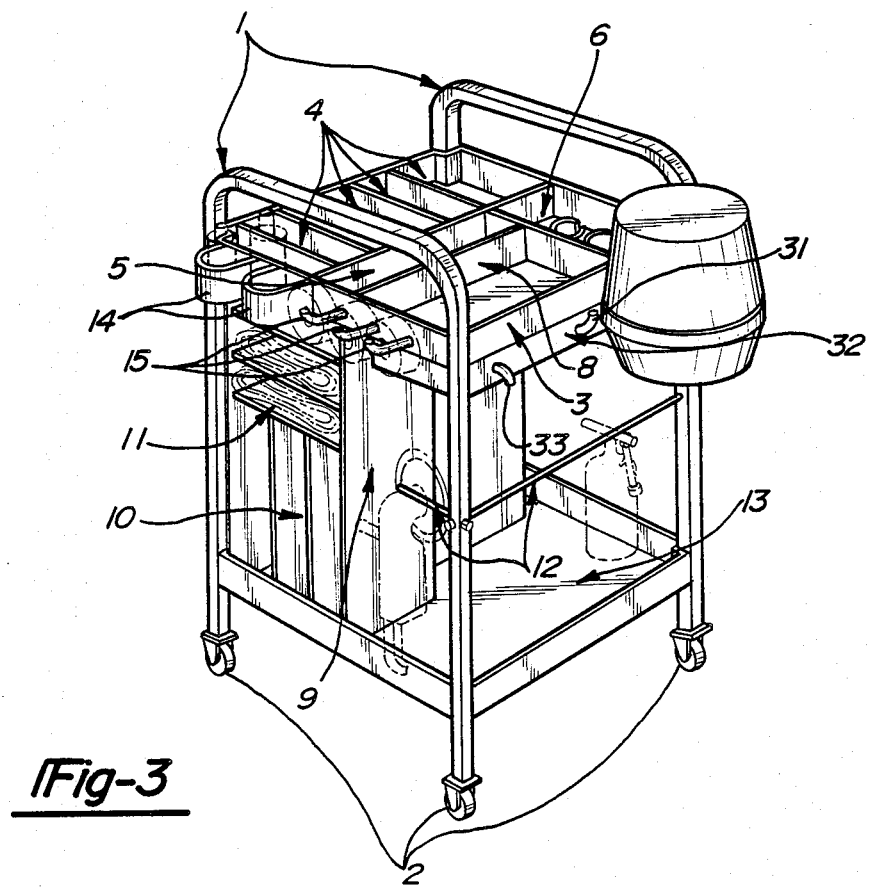
FIG. 3 is a perspective view of the main unit of the tool cart from the diagonally opposite position of FIG. 1.

In the preferred embodiment the automotive painting tool cart can be described by reference to three separate units. The first is the main unit (FIG. 1, FIG. 3). The second is one or more auxiliary units (FIG. 2). The third is suitable connection means 18.

In the preferred embodiment, the main unit has a pair of utilitarian, tubular, essentially inverted U-shaped support frames 1. Wheels 2 are attached to the bottom of the inverted U-shaped frames. A top tray unit 3 is attached essentially horizontally near the top of the inverted U-shaped frame 1. The top tray unit 3 is further divided into compartments 4, 5, 6, 7, 8 through the use of partitions located within the top tray unit of sufficient dimension to provide storage areas and an uncluttered work area. The storage areas formed by the partitions in the top tray are more specifically of a dimension to contain the tools and supplies of the automotive painting industry, including but not limited to gallon paint cans, bottles, spray cans, rolls of tape, and paint brushes. A shelf unit 9 is located below the top tray unit 3 and provides horizontal storage shelves 11 and vertical storage shelves 10 for use in storing essentially flat items. In the preferred embodiment, paint chip books are stored in the vertical storage shelves 10, and sandpaper is stored in the horizontal storage shelves 11. At least one horizontal bar 12 is attached between the inverted U-shaped frames 1 or between the shelf unit 9 and the inverted U-shaped frames 1 for use in storing tools. The tools most easily stored on such horizontal bar 12 includes paint spray guns. By simply placing the trigger mechanism on the paint spray gun over the bar and allowing it to rest on the bar, the guns are suitably stored. At least one lower tray unit 13 is attached to the U-shaped frames 1 approximately parallel with the top tray unit 3. This lower tray unit 13 provides storage for a multiplicity of items without being subdivided through the use of partitions. Additional exterior storage elements 14, 15, 16, 17 are attached to the U-shaped frames 1 or to the tray units. These additional exterior storage elements, in the preferred embodiment include baskets 14, for the storage of bottles, pegs 15 for the storage of tape, hooks 16 for the storage of rags or mask, and pegs 17 for the storage of an extension cord by wrapping it between two pegs 17.

In the preferred embodiment a removable connection means 18 is utilized to removably fasten one or more auxiliary units (described subsequently) to the main unit. In the preferred embodiment, the auxiliary unit is attached in a manner to prevent the main unit from being reduced in mobility. The preferred method of achieving this result is by elevating any potentially interfering elements of the auxiliary unit clear of the surface o which the cart rests. This allows the main unit to roll free on the wheels of the main unit.

More precisely, in the preferred embodiment, the connection means 18 consists of permanently attached handles on the auxiliary unit. These handles are located in such a way as to frictionally engage the inside edges of the U-shaped frames 1 and the top edge of the top tray unit 3. The auxiliary unit is supported in an elevated position above the ground by the friction fit of the handles and the main unit. By utilizing a friction fit the main unit and the auxiliary unit can be detached or assembled without using tools in a fast and easy manner. In addition, brackets 29 can be utilized to allow flexible straps 35 to secure the connection means 18, by passing over the connection means 18 and connecting to strap anchor points 34. This adds stability to the connection, without unreasonably slowing the detaching or assembling processes. By elevating the wheels 20 and the U-shaped frames 19 of the auxiliary cart off of the ground, the combination of the main unit and auxiliary unit move freely on the wheels 2 of the main unit.

In the preferred embodiment, a number of devices specific to the automotive body painting processes are attached to the main unit. A clean towel dispenser 28 dispensing towels singly out of its bottom is removably attached to said main unit. A D.A. paper machine 30 is attached to said main unit. A small waste basket 36 is situated between said top tray unit 3. A water tank 32 having an inlet opening 31 of a size to accommodate a standard hose and an outlet hose 33 is located below the top tray unit 3, the ends of said inlet opening 31 and outlet hose 33 being located to prevent the accidental spillage of water from said water tank 32.

An auxiliary unit (FIG. 2) also has a pair of utilitarian, tubular, essentially inverted U-shaped support frames 19 with two wheels 20 attached to the bottom thereof. By allowing two ends of the U-shaped frames 19 to rest on the ground the auxiliary unit is more rigid in operation as a free standing unit. A dispenser 22 for rolled paper 27 is attached to the Ushaped frames 19. Rolled paper is important to the automotive painting industry, in that, large quantities of paper are used in the masking of areas to be protected from paint spray. One or more large tray units 25 is attached to the U-shaped frames 19 of the auxiliary unit. These trays 25 are generally not subdivided through the use of partitions to facilitate the storage of large and bulky items, and are attached substantially horizontally. One or more storage bars 23 or support bars 21 may be attached horizontally to the U-shaped frames 19. The storage bars 23 provide storage for large items that may be drape over the bars. These items can include large sheets of paper, rags, or paint guns. If storage bars are not utilized extensively, support bars 21 may have to be added to supply a rigid structure. One or more small tray units 24 may be attached substantially horizontally to the interior or exterior of the U-shaped frames 19. This provides storage for smaller items. Tape dispenser wheel units 26 can be attached to the auxiliary unit and provide an easy and solid location for various rolls of tape. Tape is utilized quite extensively in the automotive painting industry. The location of the tape roll storage wheels 26 in conjunction with the storage bars 23 or support bars 21 may facilitate the use of tapes by providing a location for the attachment of the end of the tape itself.

In use the automotive painting tool cart as described in the preferred embodiment, is functional as one single unit or broken down into subunits. In the preferred embodiment, the auxiliary unit contains all the items essential for the particular task. This task in the preferred embodiment involves the masking and taping of areas for painting. As can be seen, all the essential elements are grouped together on the auxiliary unit. It includes the paper rolls and tape rolls necessary to perform this function. In addition knives and other small items can be contained within the smaller tray units 24. The main unit is designed for the actual painting and its corresponding tasks. If one project is being undertaken in the operation then the automotive painting tool cart ca be used as a single whole unit which provides access to all the essential tools and materials necessary to complete the task. In addition if multiple projects are being undertaken the automotive painting tool cart can be divided into its subunits and the subunit containing the tools needed for a specific task ca be taken to the location where it is needed. Since it is highly unlikely that multiple painting projects will be at the same stage of completion, this capability to divide into subunits, eliminates the need for duplicate tools in the operation as a whole.

I claim:

1. A manually propelled automotive painting tool cart comprising:
  (a) a main unit comprising:
    (1) a pair of utilitarian, tubular, essentially inverted U-shaped support frames,
    (2) wheels attached to said frame unit,
    (3) a top tray unit attached essentially horizontally near the top of maid inverted U-shaped frame,
    (4) at least one partition located within said top tray unit which provides compartments for the storage of tools and supplies,
    (5) at least one shelf unit located below the top tray unit providing horizontal storage shelves and vertical storage shelves,
    (6) at least one tool storage bar attached to said U-shaped frame,
    (7) at least one lower tray unit attached essentially horizontally to said main unit,
    (8) at least one exterior storage element attached to said main unit for storing tools exterior of the volume defined by said U-shaped support frames;
  (b) at least one auxiliary unit comprising;
    (1) a pair of utilitarian, tubular, essentially inverted U-shaped support frames,
    (2) at least one dispenser for rolled paper attached to said U-shaped frames, (3) at least one large tray unit attached substantially horizontally to said U-shaped frames,
(4) wheels attached to the bottom of said auxiliary unit,
(5) at least one substantially horizontal bar attached to said U-shaped frames providing means for storage and support,
(6) at least one small tray unit attached substantially horizontally to said U-shaped frames, and
(7) at least one tape dispenser wheel unit attached to said auxiliary unit, and (c) a connection means whereby said main unit is removably attached to said at least one auxiliary unit allowing the combination of said main unit and said at least one auxiliary unit to function as a single unit.

2. The invention of claim 1, wherein said at least one tool storage bar is attached at both ends to said U-shaped support frames of said main unit.

3. The invention of claim 1, wherein said at least one tool storage bar is attached at one end to said U-shaped support frames of said unit; and at the other end to said at least on shelf unit of said main unit.

* * * * *